US007292831B2

(12) United States Patent
Shoji et al.

(10) Patent No.: US 7,292,831 B2
(45) Date of Patent: Nov. 6, 2007

(54) RADIO COMMUNICATE METHOD AND SYSTEM

(75) Inventors: Yozo Shoji, Tokyo (JP); Kiyoshi Hamaguchi, Tokyo (JP); Hiroyuki Tsuji, Tokyo (JP); Hiroyo Ogawa, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 122 days.

(21) Appl. No.: 10/508,488

(22) PCT Filed: Jan. 9, 2003

(86) PCT No.: PCT/JP03/00116

§ 371 (c)(1),
(2), (4) Date: Sep. 21, 2004

(87) PCT Pub. No.: WO03/084093

PCT Pub. Date: Oct. 9, 2003

(65) Prior Publication Data

US 2005/0143015 A1 Jun. 30, 2005

(30) Foreign Application Priority Data

Mar. 29, 2002 (JP) ............................ 2002-093871

(51) Int. Cl.
*H04B 1/18* (2006.01)
*H01Q 9/00* (2006.01)
*H01Q 21/08* (2006.01)
*G01S 5/02* (2006.01)
*G01S 5/04* (2006.01)

(52) U.S. Cl. .............................. 455/178.1; 455/191.1; 455/193.1; 343/751; 343/824; 342/423; 342/444

(58) Field of Classification Search ............. 455/178.1, 455/191.1, 193.1, 227, 312, 326, 327, 71; 343/751, 770, 776, 778, 810, 824; 342/177, 342/423, 444, 465
See application file for complete search history.

(56) References Cited

U.S. PATENT DOCUMENTS 5,355,523 A 10/1994 Ogawa et al.

(Continued)

FOREIGN PATENT DOCUMENTS

EP 1 076 421 A2 2/2001

(Continued)

*Primary Examiner*—Nay Maung
*Assistant Examiner*—Andrew Wendell

(57) ABSTRACT

A transmitter 1 transmits from a transmission antenna 7 a mixture signal containing a radio-frequency (RF)-band modulated signal, and a portion of power of a local oscillation signal used for frequency conversion. Meanwhile, a receiver 8 detects the transmitted signal by means of a reception antenna-detection section 9. In the reception antenna-detection section 9, a plurality of base unit reception circuits 11 are disposed. Each base unit reception circuit 11 includes a planar printed antenna 12 such as a patch antenna, an amplifier circuit 13 formed on a very small planar circuit by means of an MMIC technique, and a mixer circuit 14 serving as a square-law detector. Respective outputs of the base unit reception circuits 11 are power-mixed and fed to the IF signal demodulation section. The IF signal demodulation section 10 demodulate reception data. This configuration enables realization of a reception antenna which occupies a very small space, has a detection function and a high gain, and has a wide beam characteristic comparable to that of a single-element antenna.

4 Claims, 4 Drawing Sheets

U.S. PATENT DOCUMENTS

| | | | | |
|---|---|---|---|---|
| 5,903,239 | A | 5/1999 | Takahashi et al. | |
| 6,026,280 | A * | 2/2000 | Yokomura | 455/78 |
| 6,192,225 | B1 * | 2/2001 | Arpaia et al. | 455/196.1 |
| 6,229,840 | B1 * | 5/2001 | Ichihara | 375/147 |
| 6,269,253 | B1 * | 7/2001 | Maegawa et al. | 455/552.1 |
| 6,724,804 | B1 * | 4/2004 | Kegasa et al. | 375/130 |
| 6,809,688 | B2 * | 10/2004 | Yamada | 343/700 MS |
| 6,873,608 | B1 * | 3/2005 | Plotnik et al. | 370/328 |
| 2001/0055953 | A1 | 12/2001 | Shoji et al. | |
| 2002/0151292 | A1 * | 10/2002 | Sevens et al. | 455/313 |
| 2003/0152140 | A1 * | 8/2003 | Antoniak | 375/219 |
| 2003/0193923 | A1 * | 10/2003 | Abdelgany et al. | 370/342 |
| 2004/0036165 | A1 * | 2/2004 | Ammar | 257/723 |

FOREIGN PATENT DOCUMENTS

| | | |
|---|---|---|
| EP | 1 168 649 A2 | 1/2002 |
| JP | 02-044902 | 2/1990 |
| JP | 05-048491 | 2/1993 |
| JP | 2001-53640 | 2/2001 |
| JP | 2002-9655 | 1/2002 |

* cited by examiner

RADIO COMMUNICATE METHOD AND SYSTEM

CROSS-REFERENCE TO RELATED APPLICATIONS

This application is a national phase application of International Application No. PCT/JP03/00116 filed on Jan. 9, 2003, and claims priority of Japan Patent Application No. 2002-093871 filed on Mar. 29, 2002.

TECHNICAL FIELD

The present invention relates to a radio communication method and system operating in a millimeter wave band, and more specifically, to a reception antenna used therein.

BACKGROUND ART

A radio communication apparatus for transmitting a high-speed digital signal or a broadband analog signal generally consists of a transmitter in which a product of an intermediate-frequency-band modulated signal (IF) and a local oscillation signal (LO) is obtained for up conversion, and a thus-generated radio-frequency modulated signal (RF) is transmitted; and a receiver in which the RF signal is received, and a product of the RF and an LO is obtained for down conversion, whereby an IF is produced. In such a case, in order to maintain the quality of a transmitted signal, the IF input to the transmitter and the IF generated in the receiver must have a known constant frequency difference therebetween, and variation in the phase difference with time must be small. Therefore, local oscillators for generating the LOs in the transmitter and the receiver must be high in frequency stability and low in phase noise. In particular, in a microwave or millimeter wave band in which radio waves are of high frequency, stable, low-noise local oscillators are realized by making use of a dielectric resonator or a PLL (Phase Lock Loop) circuit.

However, with an increase in the frequency to be used (e.g., in a millimeter wave band of 30 GHz or higher), the stable, low-noise oscillators become difficult to realize, and their production cost increases. For example, in the case of a dielectric resonator, its Q value (Quality Factor) decreases and fails to exhibit a desired performance. In the case of a PLL circuit, the configuration of a frequency divider becomes particularly difficult. In another method, a signal from a low-frequency oscillator is frequency-multiplied so as to obtain an LO. However, this method generally requires an amplifier for increasing the signal strength, which raises various problems, including increases in cost, size, and consumption of electrical power.

In order to solve these problems, Japanese Patent Application Laid-Open (kokai) NO. 2001-53640 has proposed a radio communication apparatus and a radio communication method (self-heterodyne scheme) as shown in sections (A) and (B) of FIG. 4. In a transmitter of this example, an intermediate-frequency-band modulated signal IF, which is obtained through modulation of input data, is mixed, by means of a mixer 83, with a local oscillation signal LO from a local oscillator 85 so as to obtain a product therebetween, whereby a radio-frequency modulated signal RF is generated. The RF is passed through a filter 86 for removal of unnecessary components and is then fed to a power mixer 87, at which a portion of the LO is added to the RF. After the RF is amplified by means of an amplifier 88 so as to increase its signal level, the RF is transmitted from an antenna as a radio signal. Meanwhile, in a receiver, a radio signal received by an antenna is amplified by means of an amplifier 91 so as to increase its signal level, and is then passed through a filter 92. Subsequently, the RF is demodulated to an IF by means of a square-law detector 93. In this method, the same LO as that used for generation of the RF signal is transmitted as a radio signal. Therefore, this method is advantageous in that influences of phase noise of the local oscillator 85 serving as an LO source are cancelled out at the time of demodulation and that the IF obtained through demodulation has the same frequency as that of the original IF input to the transmitter.

Moreover, Japanese Patent Application Laid-Open (kokai) NO. 2002-9655 discloses a system and method in which the above-described radio communication technique is applied to bi-directional radio communications.

DISCLOSURE OF THE INVENTION

However, several problems arise when an actual radio system is designed and constructed. At high frequencies; for example, in a millimeter wave band, signal propagation loss is large, and, as compared with a conventional up-converter scheme, the above-mentioned self-heterodyne scheme suffers greater deterioration in sensitivity. As a result, at least an antenna for reception must have a relatively high gain. When an antenna which has a high gain at high frequencies; for example, in a millimeter wave band, is to be realized, a plurality of antenna elements are arranged in an array, and signals obtained by means of the respective antenna elements are mixed in phase (such an antenna is called an array antenna). However, in order to enable the in-phase mixing of the signals from the antenna elements of the antenna array, in the millimeter wave band, the antenna elements must be machined with sufficiently high accuracy; i.e., with dimensional errors much smaller than one millimeter, in view that wavelengths are very short in the millimeter wave band. This requirement increases cost of such an antenna and makes it difficult to obtain a high gain as expected.

When the gain of an antenna is increased through employment of an array arrangement, although the antenna typically has a high gain in the direction of maximum radiation, it has a very narrow pencil beam which has a relative gain characteristic (directional characteristic) with respect to its radiation angle such that the antenna has a high gain in a certain direction only, and has a radiation pattern with side lobes and null points at which no antenna gain is attained. In other words, fabrication of a wide beam antenna which has high gain and is easy to use has generally been very difficult.

The present invention is directed to a reception antenna which is applicable to a radio communication system and in which reception and detection functions are integrated. In the present invention, a receiver receives an RF-band modulated signal transmitted from a transmitter, along with a local oscillation signal whose phase noise characteristic is coherent with the RF-band modulated signal, and generates a product of these two signal components, to thereby reproduce an IF-band transmission source signal. In the present invention, a plurality of unit reception circuits are disposed on the receiver. Each unit reception circuit includes a small planar antenna having a wide beam characteristic, such as a single-element patch antenna; an amplifier formed on a very small planar circuit by means of an MMIC technique; and a mixer circuit. Detection outputs of the respective unit reception circuits are power-mixed, whereby the reception antenna can function as a high-gain antenna with a detection function, and realize a wide beam radiation characteristic comparable to that of a single-element antenna.

BRIEF DESCRIPTION OF THE DRAWINGS

Sections (A) and (B) of FIG. 1 are diagrams showing an example configuration of a radio system according to a first embodiment of the present invention. Section (C) of FIG. 1 is a graph showing a transmission signal spectrum.

Section (A) of FIG. 2 exemplifies the configuration of a base unit reception circuit, and section (B) of FIG. 2 exemplifies the overall configuration of a reception antenna-detection section according to the present invention, which includes the base unit reception circuit of section (A) as a constituent element.

Figure 3:
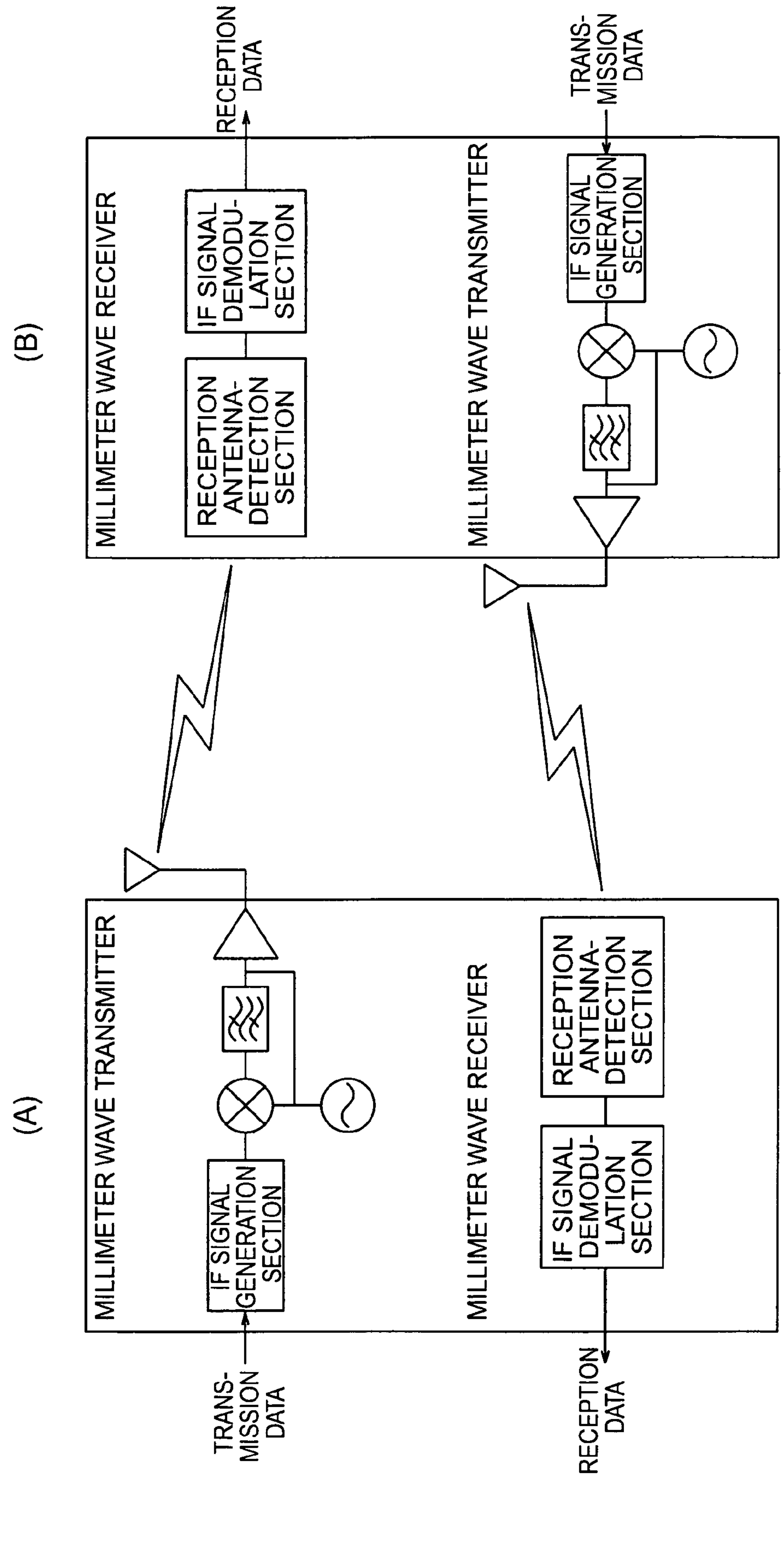

Sections (A) and (B) of FIG. 3 are diagrams showing an example configuration of a radio system according to a second embodiment of the present invention.

Figure 4:
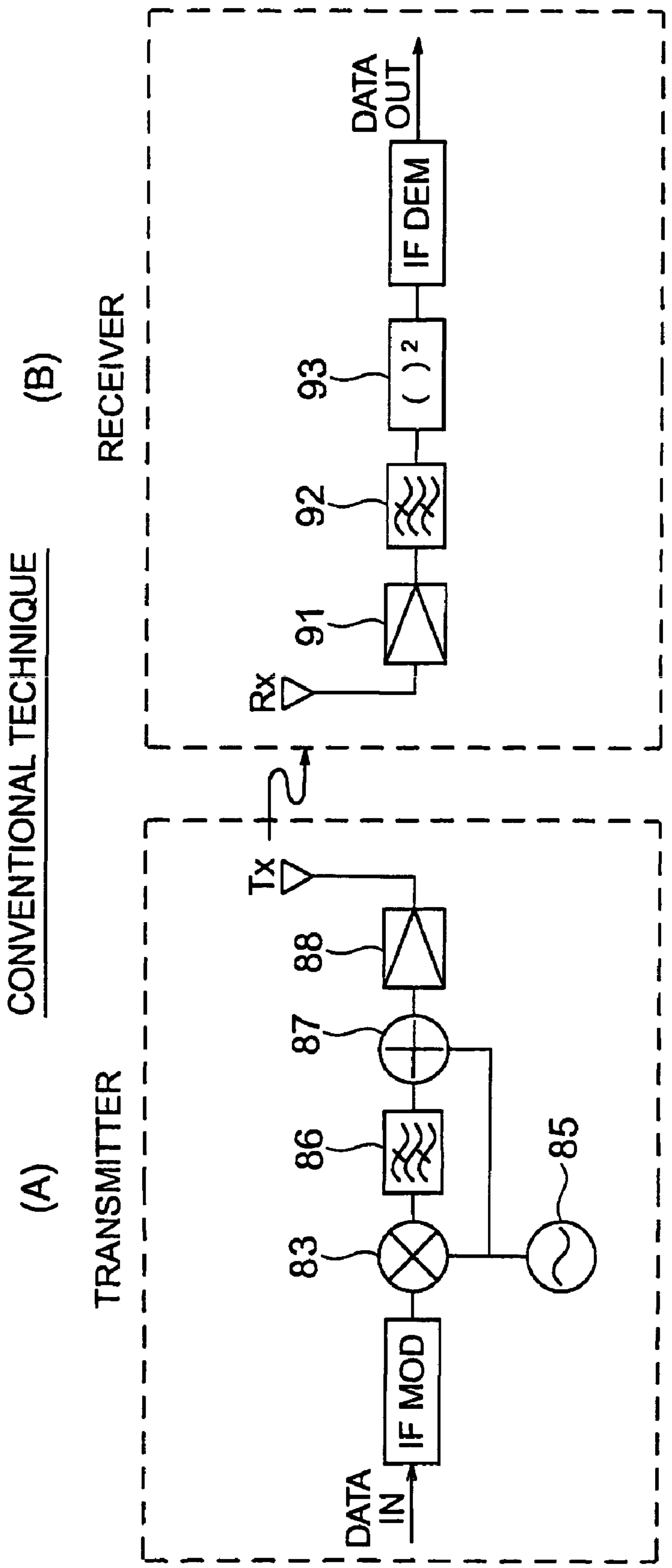
FIG. 4 (PRIOR ART)

Sections (A) and (B) of FIG. 4 are diagrams showing the configuration of a conventional radio communication system (self-heterodyne scheme).

BEST MODE FOR CARRYING OUT THE INVENTION

First Embodiment

Figure 1:
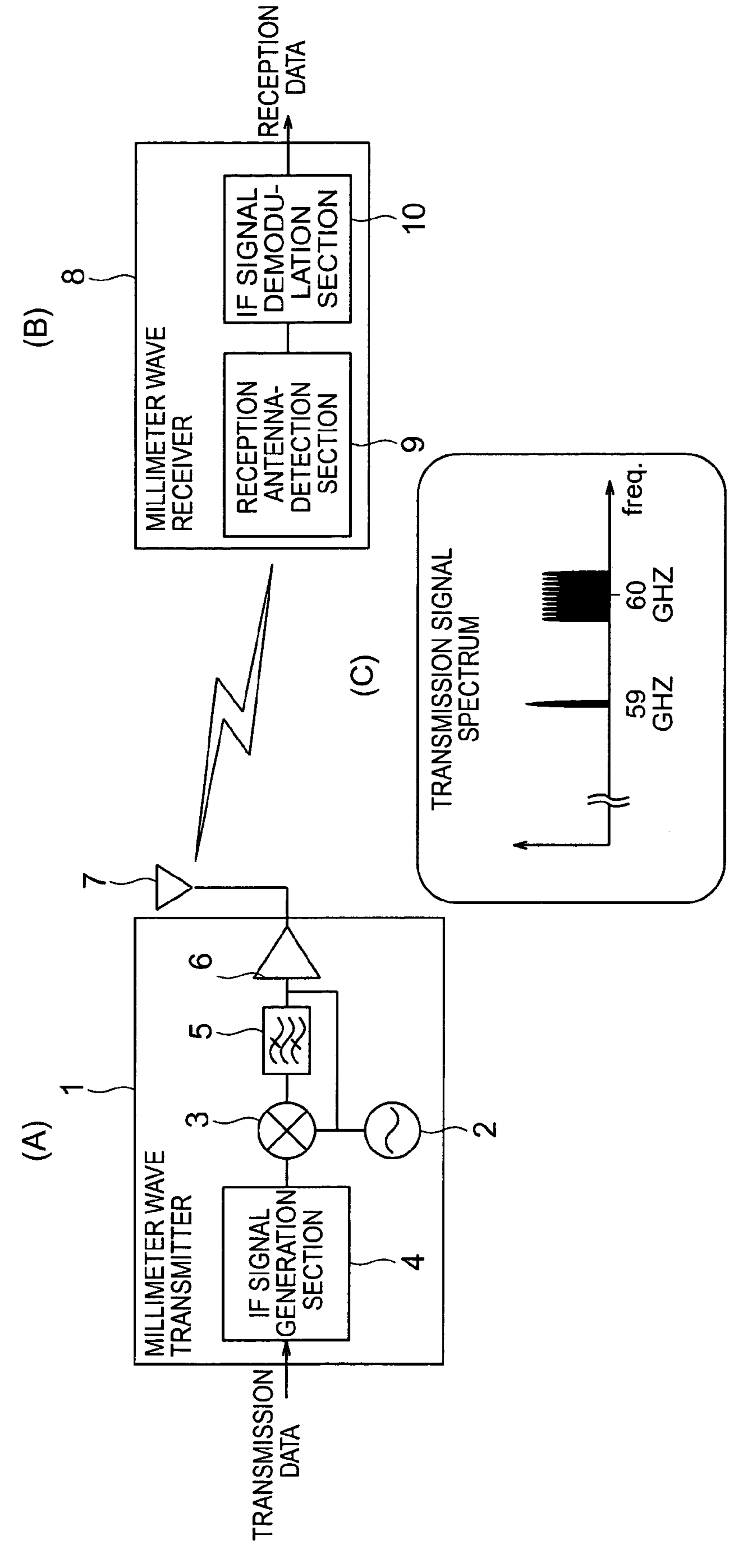

Sections (A) and (B) of FIG. 1 are diagrams showing an example configuration of a radio system according to a first embodiment of the present invention. A millimeter wave transmitter 1 includes an IF signal generation section 4 for modulating input data and outputting an IF-band modulated signal. The IF-band modulated signal is output to a mixer 3, to which a local oscillation signal is supplied from a local oscillator 2. The mixer 3 obtains a product of the IF-band modulated signal and the local oscillation signal. The thus-obtained output is passed through a band-pass filter 5 so as to remove unnecessary wave components therefrom. Thus, a radio-frequency (RF)-band modulated signal is obtained. Subsequently, a portion of power of the local oscillation signal used for the frequency conversion is added to the RF-band modulated signal. A resultant radio signal is amplified by means of an amplifier 6 and is then transmitted from an antenna 7. By virtue of the above-described transmission circuit, the transmitter transmits a signal which includes the RF-band modulated signal and the local oscillation signal having a phase noise characteristic coherent with that of the RF-band modulated signal. Meanwhile, a millimeter wave receiver 8 detects the transmitted signal by means of a reception antenna-detection section 9, which will be described later, and the output of the reception antenna-detection section 9 is input to an IF signal demodulation section 10 so as to demodulate the reception data.

Figure 2:
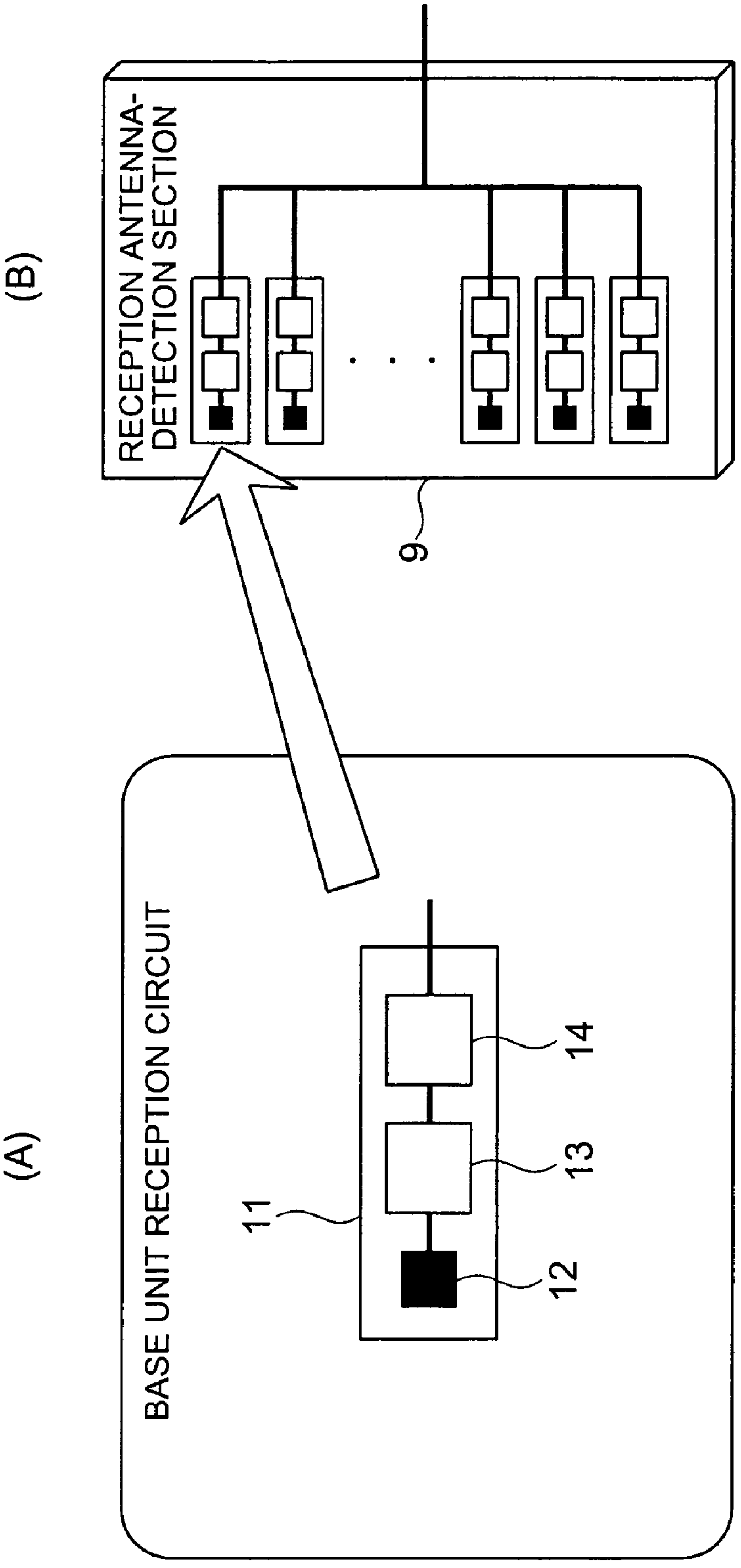

Section (B) of FIG. 2 shows an example configuration of the reception antenna-detection section according to the present invention. Section (A) of FIG. 2 exemplifies a base unit reception circuit used therein. The reception antenna-detection section 9 includes a plurality of base unit reception circuits 11 disposed therein. Each base unit reception circuit 11 includes a planar printed antenna 12 such as a patch antenna; an amplifier circuit 13 formed on a very small planar circuit by means of an MMIC technique; and a mixer circuit 14 serving as a square-law detector. Respective outputs of the base unit reception circuits 11 are power-mixed and fed to the IF signal demodulation section. This configuration enables the in-phase mixing of signals from the respective antenna elements of the array to be performed in the IF band whose frequency is sufficiently lower than the radio frequency.

Second Embodiment

Sections (A) and (B) of FIG. 3 are diagrams showing an example configuration of a radio system according to a second embodiment of the present invention. A millimeter wave transmitter and a millimeter wave receiver are provided in each of two stations which perform communications therebetween, whereby bi-directional radio communications are enabled. As in the first embodiment, a mixture signal containing a radio-frequency (RF)-band modulated signal and a local oscillation signal is transmitted from the transmitter of the first station. At the second station, the mixture signal is detected by the reception antenna-detection section, which the feature of the present invention, and the output of the reception antenna-detection section is input to an IF signal demodulation section so as to demodulate the reception data. At the same time, a mixture signal from the second station is received by the first station, and the reception data are demodulated.

INDUSTRIAL APPLICABILITY

According to the present invention, a radio communication apparatus or a radio communication method which utilizes the above-mentioned self-heterodyne scheme is realized. Therefore, the transmitter can use a low-cost local oscillator whose frequency stability is poor and whose phase noise is large, and the receiver does not require a local oscillator. Accordingly, a very low cost radio communication system can be configured. Moreover, since the above-mentioned frequency instability is cancelled at the time of detection, transmission of high-quality signals is possible.

According to the present invention, since in-phase mixing of signals obtained by means of the respective antenna elements of an array can be performed in the IF band whose frequency is sufficiently lower than the radio frequency, machining and formation of wiring for in-phase mixing do not require very high accuracy, and therefore, such in-phase mixing can be easily realized.

According to the present invention, base unit reception circuits can be disposed very close to one another, and phase differences of RF-band reception signals among the respective antenna elements of an array attain substantially ignorable levels as measured at the detection output points of the respective reception circuits. Therefore, the present invention can realize a reception antenna which has a very wide beam, a high gain, and an angle versus relative gain characteristic close to that of a single-element antenna.

The invention claimed is:

1. A radio communication method for radio communications between a transmitter and a receiver, the transmitter obtaining an intermediate frequency (IF)-band modulated signal through modulation of input data, obtaining a radio-frequency-band modulated signal from a product between the IF-band modulated signal and a local oscillation signal, mixing the radio-frequency-band modulated signal and a portion of power of the local oscillation signal used for the frequency conversion, and transmitting a resultant mixture signal from a transmission antenna, the receiver comprising a detection circuit for detecting the mixture signal, transmitted from the transmitter and received by means of a reception antenna, so as to obtain an IF-band modulated signal, and an intermediate frequency (IF) signal demodulation section for demodulating reception data from the IF-band modulated signal, the method comprising:

disposing a plurality of planar circuits in the receiver as constituent elements, each planar circuit, which serves as a single constituent element, including a planar printed reception antenna element and a planar reception circuit connected to the planar printed reception antenna element in a one-to-one relation, the planar reception circuit including an amplifier circuit and a square-law detector, wherein the plurality of planar circuits are arrayed;

receiving the radio-frequency-band modulated signal transmitted from the transmitter, along with the local oscillation signal having a phase noise characteristic coherent with the radio-frequency-band modulated signal, and producing a product component of the two components to thereby restore an IF-band transmission source signal as a detection output;

power-mixing detection outputs from the individual planar circuits; and feeding the mixed detection outputs to the IF signal demodulation section.

2. A radio communication system comprising a transmitter and a receiver, the transmitter obtaining an intermediate frequency (IF)-band modulated signal through modulation of input data, obtaining a radio-frequency-band modulated signal from a product between the IF-band modulated signal and a local oscillation signal, mixing the radio-frequency-band modulated signal and a portion of power of the local oscillation signal used for the frequency conversion, and transmitting a resultant mixture signal from a transmission antenna, the receiver comprising a detection circuit for detecting the mixture signal, transmitted from the transmitter and received by means of a reception antenna, so as to obtain an IF-band modulated signal, and an intermediate frequency (IF) signal demodulation section for demodulating reception data from the IF-band modulated signal, wherein the reception antenna of the receiver and the detection circuit for detecting the received mixture signal are formed by means of:

a plurality of planar circuits serving as constituent elements, each planar circuit, which serves as a single constituent element, including a planar printed reception antenna element and a planar reception circuit connected to the planar printed reception antenna element in a one-to-one relation, the planar reception circuit including an amplifier circuit and a square-law detector, wherein the plurality of planar circuits are arrayed; and a circuit for power-mixing of detection outputs from the individual planar circuits, wherein the radio-frequency-band modulated signal transmitted from the transmitter is received along with the local oscillation signal having a phase noise characteristic coherent with the radio-frequency-band modulated signal, a product component of the two components is produced to thereby restore an IF-band transmission source signal as an output of the power-mixing circuit, and the output of the power-mixing circuit is fed to the IF signal demodulation section.

3. A radio communication system according to claim 2, wherein the planar printed reception antenna element is a patch antenna.

4. A radio communication system according to claim 2, wherein the transmitter and the receiver are provided in each of stations which communicate one another, whereby bi-directional communications among the stations are enabled.

* * * * *

UNITED STATES PATENT AND TRADEMARK OFFICE

CERTIFICATE OF CORRECTION

PATENT NO. : 7,292,831 B2
APPLICATION NO. : 10/508488
DATED : November 6, 2007
INVENTOR(S) : Yozo Shoji et al.

It is certified that error appears in the above-identified patent and that said Letters Patent is hereby corrected as shown below:

Title Page, Column 1 (Title), Line 1, change “COMMUNICATE” to --COMMUNICATION--.

Column 1, Line 1, change “COMMUNICATE” to --COMMUNICATION--.

Signed and Sealed this

Sixth Day of May, 2008

JON W. DUDAS
*Director of the United States Patent and Trademark Office*